(No Model.) 3 Sheets—Sheet 1.
I. W. HEYSINGER.
CONSTRUCTION AND OPERATION OF ELECTRIC RAILWAYS AND TRAMWAYS.
No. 543,867. Patented Aug. 6, 1895.
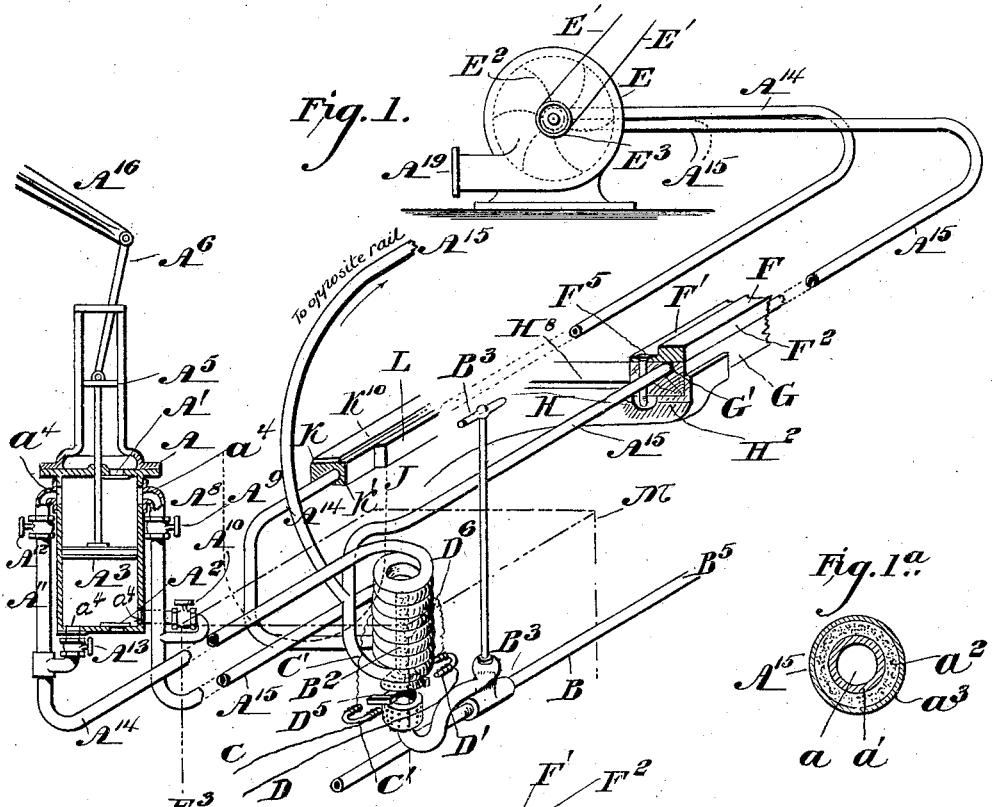
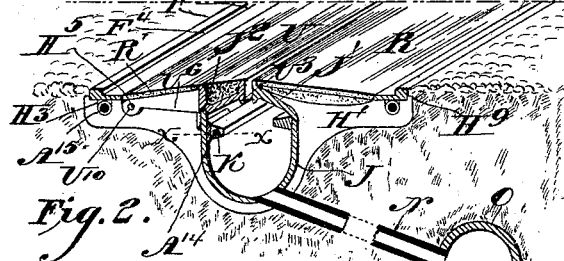
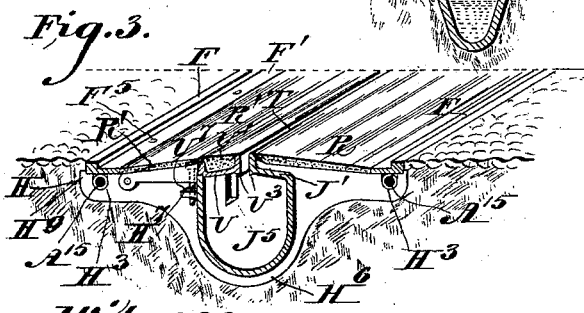
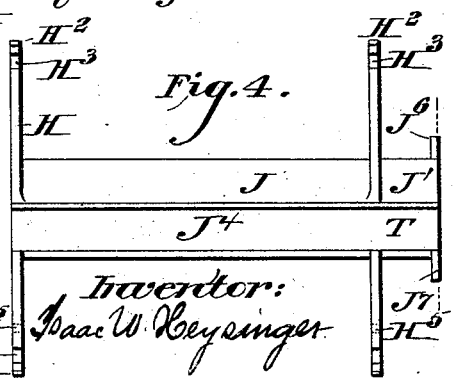
Witnesses:
Inventor:
Isaac W. Heysinger (No Model.) 3 Sheets—Sheet 2.
I. W. HEYSINGER.
CONSTRUCTION AND OPERATION OF ELECTRIC RAILWAYS AND TRAMWAYS.
No. 543,867. Patented Aug. 6, 1895.
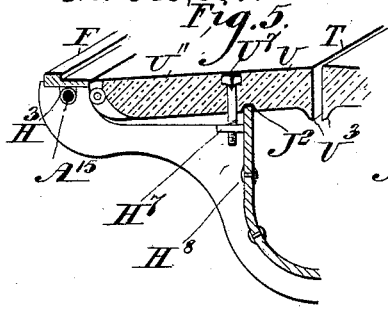
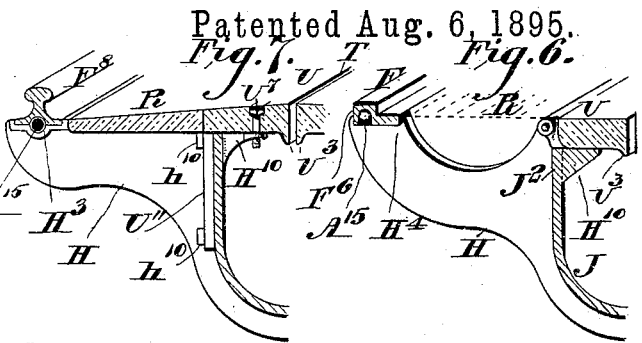
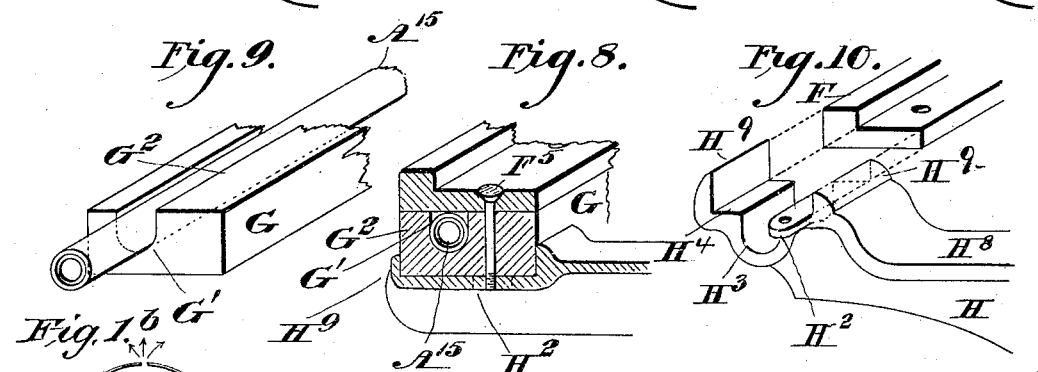
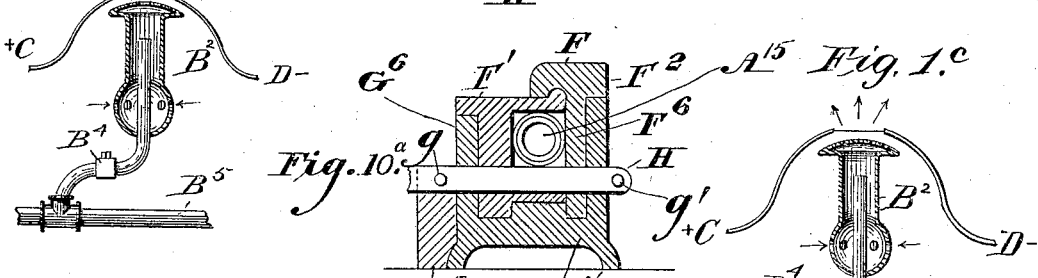
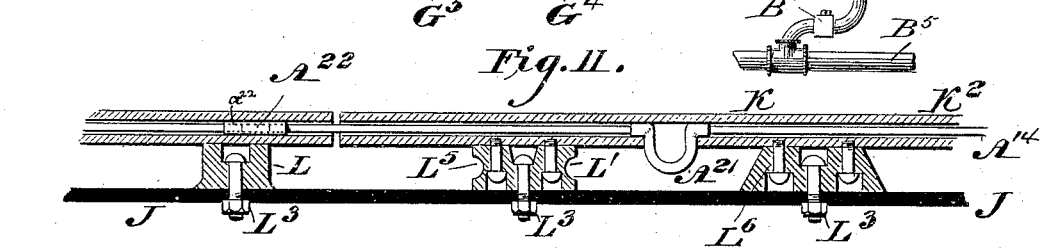
Witnesses:
C. W. Beck
John P. Nolan
Inventor:
Isaac W. Heysinger.

(No Model.) 3 Sheets—Sheet 3.

I. W. HEYSINGER.
CONSTRUCTION AND OPERATION OF ELECTRIC RAILWAYS AND TRAMWAYS.

No. 543,867. Patented Aug. 6, 1895.

WITNESSES:  
INVENTOR  
Isaac W. Heysinger.

UNITED STATES PATENT OFFICE.

ISAAC W. HEYSINGER, OF PHILADELPHIA, PENNSYLVANIA.

CONSTRUCTION AND OPERATION OF ELECTRIC RAILWAYS AND TRAMWAYS.

SPECIFICATION forming part of Letters Patent No. 543,867, dated August 6, 1895.

Application filed April 11, 1892. Serial No. 428,664. (No model.)

*To all whom it may concern:*

Be it known that I, ISAAC W. HEYSINGER, a citizen of the United States, residing at Philadelphia, in the county of Philadelphia and State of Pennsylvania, have invented a certain new and useful Improvement in the Construction and Operation of Electric Railways and Tramways, of which the following is a full, clear, and exact description, reference being had to the drawings which accompany and form a part of this specification, in in which—

Figure 12:
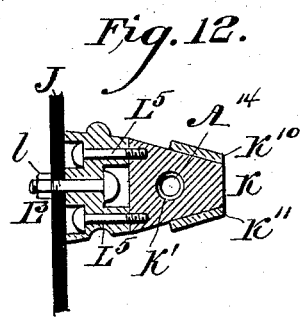
Figure 14:
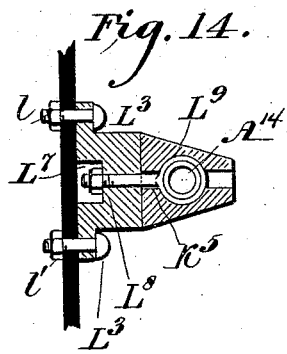
Figure 13:
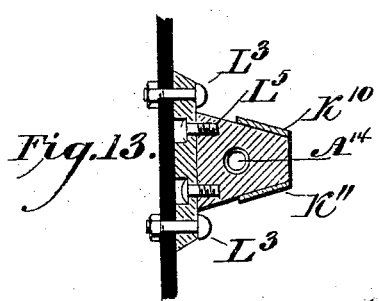
Figure 14A:
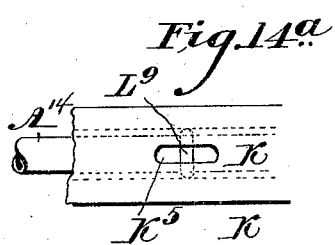

Figure 1 is a greatly shortened perspective view of an electric railway embodying my invention, the parts shown detached from their surroundings to clearly indicate the construction and operation of my invention. Fig. 1$^a$ is a transverse section of one of my heating-pipes as shown in Fig. 1, with its non-conducting and waterproof coverings. Fig. 1$^b$ shows an igniting device contiguous to the gas burner or burners within the coils of heat-pipe, in which a break in the electric wires C D, in contact with the current of fuel-gas, will ignite the same when a current of electricity is sent through the said wires by a spark leaping across the break. Fig. 1$^c$ is a modification thereof, in which an attenuated platinum wire is used instead of a break in the wires C D, which platinum wire, by its resistance to the passage of the electric current along said wires, will become incandescent and ignite the current of combustible gas flowing from the gas-pipe B$^5$ and in contact with said platinum wire. Fig. 2 is a perspective view of a section of my railway, showing the connection of the conduit with one of the city or other sewers. Fig. 2$^a$ is a perspective view of the hinged cover and pavement which closes one side of my conduit. Fig. 3 is a somewhat enlarged view, similar to Fig. 2, showing some of the parts in more detailed view. Fig. 4 is a top view of a section of one of my conduits removed from its place and seen from above. Fig. 5 is an end view, in cross-section, of the railway-conduit and one of the supporting-frames in place, the hinged covering being paved solidly back to the line of trackway on one side thereof. Fig. 6 is a somewhat similar view, the hinged support of the conduit-cover being near the slot and supported beneath by a projecting arm of the supporting-frame within the conduit. Fig. 7 is a similar view to that shown in Fig. 6, a T-rail being shown in the trackway and the hinge of the conduit-cover being dispensed with and a vertically-sliding bar and socket-support being used instead. Fig. 8 is an enlarged cross-sectional view of one of the rails and its support, and showing the heat-pipe in position. Fig. 9 is a perspective view of the wooden stringer shown in Fig. 8, with the jacketed heat-pipe in place in a longitudinal groove along its upper surface. Fig. 10 is a perspective view of one of the supporting-arms and the rail adapted thereto no wooden stringers being used. Fig. 10$^a$ is, a cross-section of an improved metallic rail and shoe, (not of my invention,) showing the jacketed heat-pipe, which forms a part of my invention, applied thereto and in place. Fig. 11 is a longitudinal horizontal section of the conduit-insulators, longitudinal wooden bars which carry the conducting-leads, and internal heat-pipe, taken along the line $x$ $x$, Fig. 2. Figs. 12, 13, 14, 14$^a$, 15, 16, 17, 18 and 19 are different views of a number of modifications of the insulators which I prefer to use for supporting my electric conducting-leads within my conduit, and with all of which are shown the heat-pipe, which forms a part of my present invention.

The lettering in all the figures is uniform.

My invention relates to the construction and operation of electric railways and tramways or similar devices for the transportation of passengers, freight, &c., whereby the interferences in traffic due to the presence of ice, snow, moisture, rain, mud, and the like are done away with, the same being artificially melted on dried up along the lines of railway, whereby loss of electric power from defective insulation and loss of power from slipping of the wheels upon the rails or obstruction upon the same is prevented, so that the railways are equally adapted to do their work irrespective of the condition of the atmosphere or of the subway due thereto.

The first part of my invention consists in the combination, with an electric railway or tramway, of a series of longitudinal pipes extended along the trackway thereof, distinct and separate from the rails thereof, which are of the ordinary sectionally-solid form, like those in general use, and contiguous to the line of rails on each side, said pipes provided with means for forcing through the same a current of heated air, brine, steam, or other fluid, and also with means of heating or maintaining the heat of the same as it passes through the said pipes along the said railway, the whole so constructed that the passage of the said heated fluid along the same will warm the metal rails of the railway, so as to melt snow, ice, or the like, and dry the same, so as to give increased traction-power to the wheels upon the same.

The second part of my invention consists in the combination, with the conducting-leads of an electric railway, of one or more continuous longitudinal closed pipes extended along the line of said conducting-leads and in contiguity thereto, said conducting-leads being of a sectionally-solid form, and said heat-pipes occupying a position between said leads and the insulating-supports thereof and supplying the said pipes with a current of heated fluid, which may be hot air or other gases, steam or brine, or the like, the said current of heated fluid adapted to dry up and evaporate moisture, snow, mud, or the like which may be in contact with the insulators which electrically insulate the same, so that loss or waste of electric energy is prevented by preventing the dissipation of the same into the walls of the conduit, (when a conduit is used,) the posts or supports, or other surrounding structures of said leads, and confining the said electric current to the said conducting-leads and the current-gatherers in sliding or rolling contact therewith; and in order to prevent the too rapid dissipation of heat from the said pipes, as explained in detail farther on, I surround them with a partially-diathermanous non-metallic covering, which may be waterproof, if desired, so that the heat may be gradually diffused along the lines of insulators and rails, without excessive loss, while still maintaining the same in a warm and dry condition.

The third part of my invention consists in the combination, with said conducting-pipes for heated fluids along the said railway, of one or more suitable force-pumps or blowers at one end or at different points along the lines of said railway adapted to force the said currents of heated fluid along the pipes contiguous to the said leads and trackway, either or both, and provided with suitable cocks, valves, and other attachments necessary for the proper working thereof. These heat-supplying pipes I carry along the railway and discharge their contents externally by means of a fan or otherwise, instead of forming closed circuits for the circulation of the contents of the same. I sometimes provide a force-pump at one end of the line and, also an exhaust-pan at the opposite end or at proper points along the line, or I interpose a mechanical blower directly along the line of pipes, so that the current will be drawn onward from the pipes in rear and forced forward through those in front continuously along the line until finally discharged at a distance from their point of supply into the external air.

The fourth part of my invention consists in providing the said pipes for the transmission of heated fluid along the said lines with additional heating devices arranged at different points along the said lines where they may be requisite to insure sufficient heating of the contents thereof or to restore the heat previously utilized along the preceding portions of the line. While any form of heating devices may be used, I prefer the form shown in the drawings, in which I provide manholes along the trackway adapted to be opened from above. Into these manholes, beneath the surface or in a suitable inclosure, I carry the pipes in the form of a close coil, and within this coil I provide a powerful Bunsen gas-burner or a series of them, which I connect with the gas-supply carried in the city mains or with a separate supply carried in the mains of the railway. The latter is very easily provided when the system is used which forms the subject-matter of my United States Letters Patent No. 385,413, dated July 3, 1888, to which I refer, and with which system my present invention is well adapted to be applied. When such system is used I prefer to supply my pipes for carrying heated fluid directly from the waste of hot gases from the gas-engines located at various points along the lines; but other heated gases or fluids may be used if desired. Of course, with this electric railway and its supply of electrical energy, when fuel-gas is not employed in the mode above described, a series of electric heaters, such as are in use for air-heating purposes, and supplied and controlled from the common source of supply of said railway, may be located at suitable intervals and employed to heat these coils or the currents of air passing along the pipes, for, as before stated, I do not confine myself to any specific form or kind of heating devices, and I do not broadly claim the construction of any specific heater, but use those in general use as adapted for my purposes.

I prefer, in ordinary use, to use the track-rails, properly connected together and in electric connection with my source of power as the return-conductor, if desired, and in such case the motor-dynamo of the motor-car receives its current through suitable contacts with the supply-lead, along which it moves and transmits the return-current through the wheels of said motor-car to the track-rails, which are electrically connected together, and are also connected with the negative pole of the stationary generating source of electric energy of the line.

The fifth part of my invention consists in providing a conduit for the transmission of electric energy along the leads of an electric railway when a conduit system is used therewith, having one section of its upper surface alongside the longitudinal slot, which admits the conductors and current-gatherers of the motor-car above, hinged or otherwise removable, so that the same can be lifted off and expose one side of the interior of said conduit to permit the introduction or removal of the conducting-leads, insulators, or other contents of said conduit, or cleansing the same when required. I form these coverings in sections of a suitable length for easy removal and extend them entirely across to the slot from one side of the trackway, or in part only. I also, as a part of my invention, form these coverings in the shape of a trough or dish opening upward, and fill this trough with asphalt, concrete, or other suitable paving material, which I prefer to make uniform with the street-pavement, so that I remove, for repairs, &c., not only one side of the covering of the conduit, but also the street-pavement as well; and I further provide, as a part of my invention, asphalt, concrete, or the like, which I pour in in a liquid form to close the cracks, joints, or interspaces between these sectional conduit-covers and the street-pavement, so as to make a solid construction. These interspaces are picked out clean before the pavement and covering are lifted.

The sixth part of my invention consists in providing the conduit along which the current-gatherers of an electric-motor car travel with a pair of drip-flanges, one on each side, extended downward from or adjacent to the margins of the slot, so that water entering the said slot may be prevented from trickling down along the walls thereof, but will be forced to drop vertically into the middle portions of said conduit and out of contact with the conducting-leads of the same.

The seventh part of my invention consists in the combination, with the conduit, internal insulators, conducting-leads, and slotway of an electric railway and the line of pipes for carrying heated fluid along the same, as described, of vent-tubes or sewer connections extended at various points where the surface dips from the bottom of said conduits to the drainage system or sewers of the town or city, or to independent drains arranged outside and below the level of the bottom of said conduit, so that any running water finding entrance to said conduit may freely pass off by said lateral tubes or channels and be prevented from accumulating to such an extent as to cover or form contact with said electric conducting-leads and divert the current therefrom.

My invention also consists in the securing of the removable conduit-cover in place by suitable fastenings, the mechanical construction of the parts required, the correlation of the various elements pertaining to my invention, and the special construction of conduits, supports, insulators, longitudinal lead-supports, and other features of detail, as will be hereinafter described; and my system, while especially illustrated as applicable to surface railways with subterranean conduit, is equally adapted, as would be done by any skilled mechanic familiar with the art to which it pertains, to elevated railways or to those operated by a superpendent electrical conducting-lead (see Fig. 18, which shows a supporting-bracket and conducting-lead with connected heat-supply pipe adapted, if desired, to be used upon an overhead-supply system or in a subterranean conduit, as may be preferred) extended along the roadway and above or beside the trackway of said railway. It is also adapted for use in other electrical constructions having exposed wires extended along and liable to be affected by dampness, wet, or snow and ice; and, as shown in the drawings, the heated fluid-carrying pipes are not only adapted to street-railways having wooden stringers and flat flanged rails, but also to T-rails and other improved rails, with or without separate longitudinal supports.

My invention also relates to the construction of trackway and conduit provided with said pipes for supplying the heat from their heated contents to said trackway and to said conducting-leads, the whole mutually supported—trackway, supporting-arms, and conduit and its contents—in a single connected structure, as shown and described; and, while heated fluid may be passed through either or both systems of pipes at the same time or continuously, yet I usually only use such heated fluids when necessary from conditions of weather or the like—as, for instance, in a dry snow-storm only the trackway-pipes may be required to be used, insulation in the leads being perfect, while in damp warm weather only the electric conductor-pipes may be used. So in warm climates the trackway-pipes may be dispensed with, if desired. In using both lines of pipes I usually prefer to make the heating-coils at the manholes in a double coil or otherwise correct them, so that heat is communicated to both trackway and conductor pipes at the same time; and my invention also consists in the use, when required, of electromagnets adapted to control the gas-valves at the manholes and sparking apparatus to ignite the gas thereat, as shown in Figs. 1$^b$ and 1$^c$, the whole controlled by electric wires extended along the lines, as is clearly shown, for a different but analogous purpose, in my Letters Patent of July 3, 1888, No. 385,413, hereinabove referred to. By these means the turning on and turning off of the gas and the igniting of the same are accomplished directly from the central station of the railway, the covers of the manholes not being disturbed. Other features of detail will appear in the specific description which follows hereinafter.

Referring now to the drawings, Figs. 1 and 2, considered together, will illustrate the invention.

In Fig. 1 I show one side of the trackway F of a railway, F being the flanged rail, having flat surface for vehicles F' and raised flange for car-wheels F². The rail rests upon the longitudinal stringer G, to which it is spiked in the usual manner at F⁵, except that I prefer to make F⁵ a screw-bolt seated in the threaded flange H² of the supporting-arm of the conduit-yoke H. It will be seen that the upper surface of the stringer G is provided with a longitudinal groove G', (see also Figs. 9 and 10,) which extends along the trackway continuously, and is covered by the flat under surface of the metal rail F, as shown. In this groove, and immediately in contact with the under surface of the rail F, is placed a continuous closed pipe A¹⁵, surrounded, as shown in Fig. 1ᵃ, by a non-conducting heat-jacket a² of fibrous or other material suitable to prevent rapid escape of heat from the pipe A¹⁵, and an external coating of waterproof material a³—such as white oil, paint, or other lead or mineral paint or the like—to prevent saturation of the covering-jacket by the water or moisture to which it may be exposed. As shown in Fig. 1, this pipe A¹⁵ extends along the trackway, one along each side and beneath each rail, as shown in Figs. 2, 3, and 4, where they remain as a part of the permanent construction. These pipes A¹⁵ A¹⁵ are supplied with a current of fluid under pressure by means of the force-pump or piston-blower A, having piston A³, operating attachments A⁵ A⁶ A¹⁶, with engine, (not shown,) and provided with valves A' A², opening inwardly and adapted to supply the said blower with atmospheric air from outside, or, if preferred, with a gas or other fluid from an adjacent reservoir by suitable connecting-pipes leading to A' and A², and not shown, and a⁴ a⁴ opening outwardly into the pipes A⁸ and A¹⁵, each of which is controlled by the cock A⁹ and A¹⁰, so that the current along the pipes A¹⁵ may be continuous or intermittent, as one or both cocks are open. At the opposite end of the line a suction-fan E is shown, operated by belting E' E', having fan-blades E², driving-pulley E³, and common outlet-pipe A¹⁹. The pipes A¹⁵ as well as A¹⁴ are discharged, as shown, through this fan. Where the line is short or the pressure from behind is sufficient this discharge-fan E may be dispensed with.

I usually employ the track-rails of my railway F F for my return-conductor, and for this purpose I connect electrically, by means of the motor-dynamo and wheels of the traveling motor-car, my conducting lead or leads K¹⁰ with these track-rails, and also electrically connect said track-rails together and also with the negative pole of the generating source of electric power of said line; but, if desired, I use a separate return-conductor, though for cheapness of construction and to secure the common supply of heated air to both conductor and track-rails I prefer to combine the two in a single electrically-connected construction, as shown in the drawings. The force-pump and exhaust, one operating behind and the other in front of the air-supply, conjointly maintain the movement of the currents of heated air through the pipes and may be located at any point of the line convenient therefor.

Along the line at various points I interpose heating devices, and one of these is shown in Fig. 1 at M, a manhole which is occupied by a coil of pipe formed upon or secured to A¹⁵, so as to make a continuation thereof. Within this coil is seen a Bunsen gas-burner of sufficient size, or several of them, adapted to produce a high heat without smoke.

B³ shows the handle of the cock by which the gas is turned on from the gas-supply pipe B through a T-joint, and B² is the burner in place within the coil.

The gas may be ignited by a match and the supply controlled by the handle B³ when the manhole-cover is raised; but I also show electric wires C and D under ground, as shown, and these positive and negative electric wires acting through the electromagnets C' and D' operate the slide-valve D⁵ and open or close the gas-valve instead of operating it by hand by the handle B³. The electromagnet D', by a continuation of its supply-wire D⁶ into an electric gas-lighting device—such, for instance, as is described and shown in my Letters Patent aforesaid, No. 385,413, dated July 3, 1888—by an interruption and ground connection within the current of flowing gas, ignites the same. The electric igniting devices are clearly illustrated in Figs. 1ᵇ and 1ᶜ, Fig. 1ᵇ showing a current break and spark and Fig. 1ᶜ an incandescent platinum wire, though other well-known devices for like purposes may be employed, if desired. The opposite electromagnet controlled by the wire C withdraws the valve D⁵ and shuts off the gas. These wires C and D may be positive or negative and connected with the electric-railway conductors, if desired. The pipe B⁵ is an ordinary fuel or illuminating gas pipe extending along the street.

When lines of gas-supply do not extend along the trackway, or when I prefer to use electrical heating-furnaces, as before described, I dispense with the gas-cock devices and connect the electrical resistance-coils with the electrical supply-current by suitable interposed switches analogous to my gas-cock and igniting devices, so that I am enabled from the central or other station of the line to throw on or off the current from these resistances precisely as when I use the gas heating-furnaces, as shown.

In Fig. 1 I also show, partially broken away, a part of the buried conduit in a surface railway which carries the conducting-leads, one of which K K¹⁰ is seen in place. The metallic conductor K¹⁰ in this figure is a strip of copper or other suitable metal laid upon and secured continuously to a longitudinal series of wooden bars K K, as shown in Fig. 11. These wooden bars K K form supports for the conducting-leads and are baked dry and saturated with asphaltum, pitch, resin, or other electrically-insulating and non-absorbent material and are secured at intervals by suitable insulating-blocks L to the inner walls of the conduit J. In my present invention I prefer to use these continuous wooden bars, which I have fully shown, described, and claimed in my United States Letters Patent No. 391,792, dated October 30, 1888, and also in my United States Letters Patent No. 385,413, dated July 3, 1888; No. 391,793, dated October 30, 1888, and No. 398,963, dated March 5, 1889, with all of which inventions my present invention is especially intended to operate, though it is well adapted for use with any system of electric railway or tramway—underground, surface, elevated, or overhead. The wooden bars K K are bored from end to end, like the ordinary cistern pump-stocks in general use, and may be ten or twenty feet long, or they may be grooved, like the stringers G, as shown in Fig. 9, and covered with the conducting-strip in the same manner as the rail covers the groove in Figs. 1, 9, and 10, if desired. By boring out the wooden bars, however, they become self-jacketing, as the wood is a slow conductor of heat, and will become only warm through its thickness, while the pipes themselves are quite hot. All that is wanted is a moderate warmth to keep the wooden bars and attached insulating-blocks K and L dry, as an excessive heat of the conductors would somewhat diminish their electrical conductivity, as well as cause a large loss of heat to no purpose.

In Fig. 1 the hot-air pipe $A^{14}$ is seen in place, extended through the wooden bar K, the said bar provided with the conducting-strip of copper $K^{10}$ and the insulating-block L, by which it is secured to the conduit J. The pipe $A^{14}$ draws its supply of heated fluid, or fluid to be heated, from the force-pump A, just as the other pipes $A^{15}$ do, and is provided with separate cocks $A^{12}$ and $A^{13}$, so that by opening one or both an intermittent or a continuous current can be driven through the pipe $A^{14}$.

While I divide the pipe $A^{15}$ into two branches, as shown, one to supply each rail of the trackway, I do not show a pipe in the side of the conduit having a return-current conductor, as the connection back to the dynamo in the station will be clearly understood from the figures, and in some cases the separate return-conductor may itself be dispensed with, the rail of the railway being used therefor, and in other cases the use of the heat-pipe in said return-conductor may not be required.

The arrangement is reversed in Fig. 1, the supply-conductor being shown on the right; but that is immaterial, and is only so placed for clearness of illustration. As shown also in Fig. 1, the coil of the pipe $A^{14}$, which is marked in the coil by its appropriate letter, forms a part of the double coil $A^{14}$ $A^{15}$, the pipes passing independently of each other, however, so that the same heating apparatus will heat both and the same valves and connections will supply both. It will be seen that the cocks at the force-pump A permit either $A^{15}$ or $A^{14}$ to be supplied with a current independently of the other or both simultaneously, as the state of the weather may require. In like manner the exhaust-fan E receives its current from both $A^{14}$ and $A^{15}$. When I pass the pipe $A^{14}$ through the wooden bar K, bored at K', no jacketing may be required; but in other cases—as, for instance, in that shown in Fig. 18, which is adapted for overhead or other electric supply—I jacket the pipe $A^{14}$, as shown in Fig. 1ª, and form the copper conductors $K^{10}$ and $K^{11}$, one, or both, if two are required, upon the outer surface, as shown.

In Fig. 2 I show the conduit J connected by the lateral sewer-pipe N with one of the city drains O, in which latter the contents P are shown below the level of the conduit J. I supply these at suitable intervals and usually in concavities along the roadway, so that such surplus water as may enter the conduits from rain or sudden influxes from flood or the like will rapidly pass out of the conduit and prevent overflow of the conductors $K^{10}$ thereof. To prevent this water from trickling around the inner walls of the conduit J and finding lodgment upon the insulating-blocks L or the supporting-bars K, I provide the slot T, through which the current-gathering bar of the car above passes down to make contact with the conducting-leads, with a drip-flange extending downward along the said slot and on each side thereof, as shown at $U^3$ $U^3$, Figs. 2 and 3. As shown detached in Fig. 2ª, I sometimes provide it with a notched lower margin $u^3$ $u^3$ $u^3$, so that the water may not accumulate by running along the same upon grades, but may drop off as soon as it reaches the free margin beneath.

It will be observed that the pipe $A^{14}$ must be applied within the conduit J after the same has been completed and in place, as the pipe $A^{14}$ is continuous from end to end, or for sections of the railway of considerable length. Hence it is necessary to provide means whereby the interior of the conduit can be opened sufficiently to permit the bars K and the pipes $A^{14}$, as well as the conductors $K^{10}$, to be placed within the same and properly secured, and also to permit repairs, &c., to be made when required. I show in Fig. 11 the means whereby I prevent injurious action from the expansion and contraction in length of the pipe $A^{14}$ within the conduit.

At $A^{21}$, I show a U-joint interposed along the line of $A^{14}$; but I prefer to use the sliding joint with interposed packing $a^{22}$ $a^{22}$, (shown at $A^{22}$,) since the loss of heat will be but trifling and the exit of the heated fluid from the pipe $A^{14}$ may be made inappreciable by tight packing. These joints also must be prepared and kept in order by opening the conduit, and accumulations of mud along the bottom require at times to be cleaned out. For these purposes I provide my conduit with a cover capable of being raised therefrom either by a hinged joint or by lifting it out of bearings, and this cover I provide along one side of the slot T, preferably upon the side occupied by the pipe $A^{14}$, the opposite side of the slot and the street-pavement being made solid upon the opposite side.

As shown in Figs. 2, 3, and 4, and in the detached cover shown in Fig. $2^a$, the conduit is overarched at its solid side; but upon the side adapted to be opened it terminates at $J^2$ in a vertical ridge or edge several inches, more or less, beneath the level of the roadway, and leaving an open vertical space $J^4$ between the said vertical edge $J^2$ of the conduit and the slot T, which space $J^4$ is closed by the removable cover U, as shown.

The body of the conduit J, I prefer to make of sheet metal; and I illustrate a method of making such conduits with economy and efficiency in my United States Letters Patent No. 325,173, dated August 25, 1885, to which I refer; but a conduit of concrete or cement may be used, if desired. I prefer to make these conduits small in cross-section, from eight to ten inches in internal diameter, and the slot T from three-eighths to a half-inch in width, which is quite sufficient. To support the trackway and the conduit I provide iron or steel yokes at intervals of a few feet along the line, which are shown at H, Figs. 1, 2, 3, 4, 5, 6, 7, 8, and 10. These are of flanged iron, and the outer ends of the arms support the trackway, extending inward beneath the surface of the roadway, so as to embrace the conduit, to which it is securely attached, the yokes being continuous from one side of the trackway to the other.

In forming the cover of one side of my conduit, I provide, as shown in Fig. $2^a$, a hollow dished longitudinal pan, so to speak, of metal, which I prefer to corrugate at the bottom, as shown at $U^2$. The free edge of this pan forms one side of the slot $U^3$ when in place, and at the rear side I provide arms $U^5$ $U^6$, extended backward and beneath the street level. The ends of these arms are provided with pivot bearings or openings $U^9$ $U^{10}$, whereby they may be hinged between the adjacent yoke-arms H, Figs. 2, $2^a$, and 4, a corresponding bearing $H^5$ being provided, so as to make a hinged joint with $U^9$ and $U^{10}$. A notch $J^2$, Fig. $2^a$, extends along the under side, and when in place rests upon the free edge of the conduit at $J^2$, as shown in Figs. $2^a$ and 5. Bolts $U^7$ are provided to hold the cover U in place, screwed into the threaded flange $H^7$, Figs. 3 and 5. When in place, the cover extends over one-half the conduit J, and may be raised upon its hinged bearings, so as to expose the interior of the conduit. I fill the pan $U^2$ $U'$ with concrete, asphalt, or other pavement composition or material, securely cemented in, so as to make a permanent pavement for the street similar to that upon the opposite and solid side. Over the sunken spaces occupied by the arms $U^5$ $U^6$, I pour in hot coal-tar or the like when the whole is complete, or ram it with small pebbles and asphalt or the like. To open the conduit these are picked out with a pick, and the section of cover, usually the space between two of the yokes, may be lifted by a lever or a jack. In Fig. 2 I show the hinge-arms $U^5$ $U^6$ extended back to form their hinged bearings near the line of trackway, but the dished or paved portion $U'$ only occupying the space over one-half the conduit, while in Fig. 5 the dish and pavement are carried entirely back to the line of rails, or, what is the same thing, the free arms shown in Fig. $2^a$ are formed into an extension of the dish $U'$ back to the hinge, or nearly so. In Fig. 6 the whole constrution of cover only occupies the space over one side of the conduit, the hinges being placed over the edge $J^2$ of the conduit, or just in rear thereof, to afford room for raising the cover. To support this cover, as there is no backward extension to support it by leverage, I extend lugs $H^{10}$, which form an integral part of the yoke H, forward into the conduit above the line of conducting-leads, and the under surface of the cover U rests upon these lugs, as shown.

In Fig. 7 I do not use hinges, but in a construction similar, proportionally, to Fig. 6 provide downwardly-extended arms $U^{11}$, which pass down alongside the yokes H and are socketed in openings $h^{10}$ $h^{10}$, formed therein. To remove this cover, the whole is raised vertically and laid aside. Lugs $H^{10}$ support this cover within the conduit, just as in Fig. 6. In all these the cover is held down against accidental displacement by bolts $U^7$, engaging, through the cover, into the yoke H or some part of the substructure. If securely held without these bolts, they may be dispensed with, or latches or other fastenings used, if desired. The filling of the cracks between the sections of cover is shown at R', Fig. 3.

While in Figs. 1, 8, and 9 I show an ordinary flat flanged tramway-rail with grooved wooden stringer, I do not confine myself to any special form of rail or to the use of stringers, as in Figs. 5, 6, 7, and 10 I show the rails supported on seats formed in the ends of the arms $H^4$ of the yokes H. In Fig. 7 I show a T-rail, such as are in use on ordinary railroads. In Fig. 7, as well as Fig. 6, I show the groove for the reception of the heat-supplying pipe $A^{15}$, formed in the body of the rail itself instead of beneath in the stringer, and in Fig. $10^a$ I show an improved rail (which, however, forms no part of my present invention) to which my heat-pipe is adapted. This rail consists of two parts, $F^2$, $F^6$, and F', each having a vertical rib and head pieces locking into each other, as shown, and supported in a shoe G, suitably hollowed out. The tie-rod H, I connect with the yokes, as in my other figures, and the heat-pipe $A^{15}$, I carry along above the tie-rod H and immediately beneath the rail-surfaces, as shown. In Fig. 10 the groove $H^3$ is shown cast in the seat H⁴, the rail F occupying the space between the ribs H⁹ H⁹ and secured to the seat by bolts seated in H².

I do not confine myself specifically to the forms of construction shown in the above-named figures, which I use to clearly illustrate the classes of rails and seats to which my pipe A¹⁵ may be applied. The conduit which I prefer to use (when I use a conduit system) is shown partially in Fig. 1 and more in detail in Figs. 2, 3, and 11. In Fig. 3 I show a slot J⁵ in one side. In this construction I support the bars K K and the conducting-leads by an insulator-block like that shown in Fig. 17, in which the insulating-block L, of glass, vulcanite, okonite, or other non-conducting material, is provided with a vertical neck adapted to fit into the notch J⁵ and an enlarged head L¹⁰, wider than the notch, so that when the cover U is removed the whole may be slipped into place with the bars K K, conductors K¹⁰, and heat-pipe A¹⁴ in a continuous length as the work progresses. When the cover U is replaced it will rest upon and tie down the insulators in the slot and form a rigid construction all along the line, and one easily applied or removed.

Figure 17:
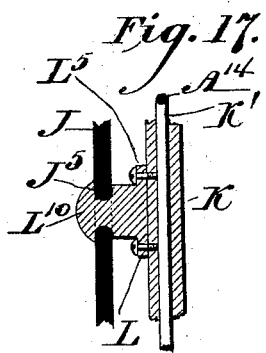
Figure 18:
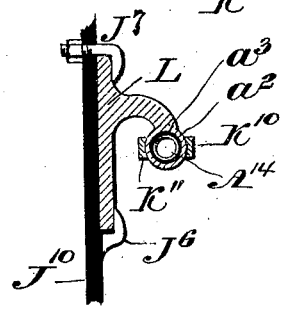
Figure 19:
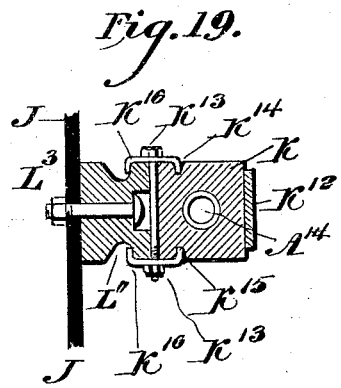

The sectional view of Fig. 18 shows the heat-pipe A¹⁴ adapted for use in Fig. 17, as well as the other figures; but in Fig. 18 I fasten the insulators by a notched seat below and a turn-button or bolt above.

For underground construction I prefer to use the conduit and insulators as shown in Figs. 3 and 17, whether the bars K K be of wood, or of packing, or bored, or grooved, or be dispensed with, as shown in Fig. 18.

Figure 15:
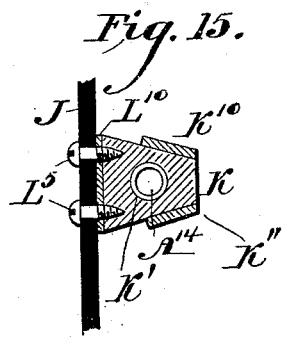
Figure 16:
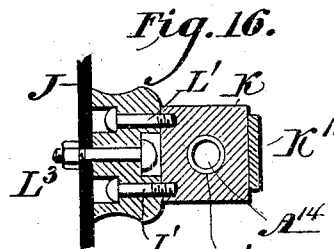

The insulators shown in Figs. 11, 12, 13, 14, 15, 16, and 19 are various modifications in detail of those shown in my Letters Patent No. 391,792, dated October 30, 1888, hereinabove referred to, having applied in connection therewith my heat-pipe A¹⁴. In Fig. 12 the insulator is attached to the wooden bar by countersunk bolts, preserving the insulation while securing the insulator upon both sides. In Fig. 13 there are projecting shoulders L³ L³ for the conduit-bolts. In Fig. 14 the bolt which supports the bars K K encircles the pipe A¹⁴, and the rear side of the insulator is secured to the conduit and the front side to the bar K, the bar K being slotted, as shown in Fig. 14ª, to permit the ring L⁹ to enter and be turned at right angles to receive the pipe A¹⁴. In Fig. 15 the insulator is a flat plate of vulcanite, or the like, the screws seated in the wooden bar K. In Fig. 16 the conductor extends along the front of the wooden bar K, and is adapted to a brush, plate, or flat roller current-gatherer, and in Fig. 19 clamps above and below K¹⁴ K¹⁵ are employed to hold the bars K K in place, the clamps being held together by the cross-bolt K¹³. As above stated, I prefer to use the form shown in Fig. 17, and the conduit to conform thereto, as in Fig. 3, with all sorts of conducting-leads, when adapted therefor, and I make this a specific part of my invention.

I do not rigidly confine myself to the devices precisely as shown in the drawings, but modify the same in various ways to conform to special requirements, without departing from the principle of my invention, as herein shown, described, and claimed, and I do not confine myself to a single railway embodying in itself all the parts of my invention, but I apply to such railway such special parts thereof as be may desired, without impairment of my rights thereto, and I apply my said invention to all forms of railway to which it may be applicable, whether above or under ground, and to other systems of traffic or transportation analogous thereto.

Having now described my invention, what I claim, and desire to secure by Letters Patent, is—

1. In an electric railway, in combination with the trackway consisting of a sectionally solid line of rails along each side thereof for the support of the wheels of cars traveling thereupon, and a continuous electrical supply conducting lead along the said railway for supplying electric energy to the motor dynamo of said cars, said rails and said electrical conductor properly supported in place for permanent use, the series of heat conductors, A¹⁵ A¹⁵ A¹⁴, extended along said railway, the heat conductors, A¹⁵ A¹⁵, contiguous to the rails of said railway separate therefrom and adjacent thereto and the heat-conductor, A¹⁴, contiguous to the electrical conducting lead thereof disconnected from said conducting leads and extended along substantially parallel thereto, and adapted, when filled with a current of heated fluid to communicate the warmth thereof to said rails, and to said conducting leads and the insulating supports thereof, together with means for supplying said heat conductors with a current of heated fluid, under pressure, the whole constructed substantially as and for the purposes described.

2. In an electric railway, in combination with the rails, F F, and the conductor K¹⁰ and supports K, extended along the lines thereof, the pipes, A¹⁵ A¹⁵, separate from, parallel with, and extended along the said rails and contiguous thereto, and the pipe A¹⁴, extended along the said conductor longitudinally, but disconnected therefrom, and said pipes secured to its supports, K K¹⁰, and contiguous thereto, together with the forcing pump or blower, A, adapted to force a continuous or intermittent current of heated fluid through the said pipes, substantially as and for the purposes described.

3. In an electric railway, in combination with the rails, F F, and electric supply conductor, K K¹⁰, properly supported, the continuous, or sectionally continuous heat pipes, A¹⁵ A¹⁵, A¹⁴, extended along the said rails and the said line of conductor, said pipes separate from said rails and said electric conductor;

and parallel therewith, and provided with means of forcing currents of heated fluid through said pipes to warm and dry the same, together with one or more heating furnaces, M B², A¹⁵ A¹⁴, along the said line of railway constructed and adapted to heat the currents of fluid passing through said pipes, or to restore the heat thereof previously expended along said rails and said conductor, substantially as described.

4. In an electric railway, in combination with the trackway for the wheels of the cars thereof, and an electric supply conductor extended along the same and adapted to supply electric energy to the traveling motor car of said railway, the independent heat pipes, A¹⁵ A¹⁵, extended along said trackway, contiguous to but separate from the rails thereof, and the heat pipe, A¹⁴, extended along said supply conductor and contiguous to but continuously disconnected from and parallel with said pipes, and secured to the supports and insulators thereof, together with force pump, or blower, A, adapted to force a current of fluid through said pipes, and one or more heating furnaces, M B², along said railway adapted to supply heat to the fluid contained in said pipes, substantially as and for the purposes described.

5. In combination with an electric railway having trackway, F F, and electric supply conductor, K¹⁰, extended along the same, the independent tubular heat conductors A¹⁵ A¹⁵ extended along the said trackway, and contiguous to the rails thereof, said tubular heat conductors, A¹⁵ A¹⁵, having a suitable heat retarding covering, a², and said tubular heat conductor, A¹⁴, having a suitable heat retarding jacket or covering, K, either as a supporting jacket, or a simple heat retarder, said covering partially diathermal and so constructed as to gradually and equably distribute the internal heat of said tubular heat conductors to the laterally adjacent and separate metallic conductor and rails, and slowly and continuously dry and warm the same, the whole constructed substantially as and for the purposes described.

6. In an electric railway, in combination with the rails, F F, the continuous line of heat pipes, A¹⁵ A¹⁵, contiguous to said rails but separate therefrom and parallel therewith and adapted to communicate the heat of said pipes thereto, the heat retarding covering, a², adapted to permit a slow and gradual emission of said heat to said rails and waterproof protection, a³, together with means for forcing a current of heated fluid through the said pipes, substantially as and for the purposes described.

7. In combination with the trackway, F F, and supports for the rails thereof, the line of separate and parallel pipes, A¹⁵ A¹⁵, extended along the rails of the said trackway, and contiguous thereto, and supported by the supports thereof, said pipes surrounded by an external and partially diathermal covering adapted to maintain a substantially equable temperature of said pipes against unequal radiation in combination with a force pump or blower, A, adapted to force a current of heated fluid through said pipes, and maintain the same under pressure and means for heating the said fluid, together with separate means for reheating the said fluids in the said pipes in transit at different points along the line thereof, substantially as described.

8. In combination with the rails, F F, and supports thereof, the pipes, A¹⁵ A¹⁵, carried along the lines of said rails, and contiguous thereto, said pipes supported in suitable grooved brackets or supports, beneath, and adapted to communicate the heat of their heated fluid contents to said rails, said pipes having heat retarding covering, a², together with force pump or blower, A, and heating furnaces, M B², adapted to force a current of heated fluid along the interior of said pipes, substantially as described.

9. In combination with the supports H⁴, the double line of rails, F F, supported thereupon, said supports suitably grooved for the reception of a continuous line of pipes, A¹⁵ A¹⁵, and said grooves covered by the under surfaces of said rails, together with line of heat pipes, A¹⁵ A¹⁵, occupying said grooves, beneath said rails, and adapted to communicate the heat thereof to the rails above, and warm and dry the same when required, substantially as described.

10. In combination with the supports, H H, having rail seats, H⁴ H⁴, and a line of rails, F F, supported thereby, the line of heat pipes, A¹⁵ A¹⁵, extended along each of said rails, F, F, above said supports, and beneath said rails, and contiguous thereto, the said pipes adapted to communicate the heat of their heated contents slowly to said rails, and warm the same when required, substantially as described.

11. In combination with the force-pump or blower, A, having exit pipe, A¹⁵, said exit pipe adapted to be heated, and thereby heat the fluid contents thereof, a series of separate heating furnaces, M B², together with lines of heated-fluid pipes, A¹⁵ A¹⁵, extended outwardly and with no return circuit of said fluid along the rails, F F, of a railway, and contiguous thereto, and the distant extremities of said pipes being constructed to discharge said fluid from use, said pipes connected with said heating furnaces and adapted to receive a current of fluid under pressure from the said blower, and to transmit the same, when heated under pressure along the said pipes, A¹⁵ A¹⁵, its contained heat being gradually exhausted, substantially as and for the purposes described.

12. In combination with the rails, F F, supports, H H, heat pipes, A¹⁵ A¹⁵, blower, A, and manhole, or chamber, M, along the line of railway, the section of pipe in said manhole, forming a part of the heat pipes, A¹⁵ A¹⁵, and adapted to have forced through said section, the current of fluid under pressure from said blower, a heating-furnace surrounding or contained within said section of pipe, B², and adapted, when heated to heat the said fluid during its transmission along the line of railway, substantially as described.

13. In an electric railway, in combination with the bare metal conducting lead, $K^{10}$, longitudinally exposed to contact with the current-gathering devices of an electric motor car, and the supporting insulators therefor, a heat pipe, $A^{14}$, extended along the said insulators and supported thereby, and contiguous to said conducting lead, but separate therefrom and located between said conductor and its permanent supports, and adapted to warm and dry the said insulators without unduly heating said conducting lead, and prevent the dissipation of electric energy, together with means for forcing a current of fluid under pressure along the interior of said pipe, $A^{14}$, and means for heating the same artificially, by separate furnaces located at different points along said line, together with connecting devices extended from said furnaces to the supply station of said line, and adapted to enable said furnaces to be controlled in their supplies of heat to said heat pipes directly from said supply station which furnishes the motive power or hot-air currents of said railway, substantially as described.

14. In an electric railway, in combination with the force-pump or blower, A, and a series of separate heating furnaces, M B², adapted to force a current of heated fluid along suitable pipes, and maintain the same under pressure the electrical conducting lead, $K^{10}$, together with the independent heat pipe, $A^{14}$, extended along contiguous to said lead and along its insulators, and adapted to warm and dry the said insulators without unduly heating the said leads, said pipe, $A^{14}$, connected with and operated by said force pump or blower, and said heating furnaces, so that, when desired, the said force pump and furnace may be put in operation and a current of heated fluid forced along within said pipe, $A^{14}$, together with controlling devices extended from said force pump or supply station to each of said separate furnaces, and adapted to enable said furnaces to be controlled in their supply of hot air to said pipes, by turning on or off their heat-generating energy from said common station, substantially as described.

15. The improvement in electric railways consisting in means for artificially warming and drying the continuously extended wooden bars which constitute the insulators and supports of the same, by an artificially heated surface extended along said insulating and lead-supporting bars between said supports, and the laterally extended bare metal leads of said electric railway, and adapted to be continuously maintained in a warm condition, substantially as and for the purposes described.

16. In an electric railway, in combination with the rails of the trackway, F F, and the line of heat supplying pipes, $A^{15} A^{15}$, extended along the same, and the electric conducting lead, $K^{10}$, and the independent line of heat supplying pipe, $A^{14}$, extended along the same, the force pump or blower, A, separate outlets leading into the pipes, $A^{15}$ and $A^{14}$, and separate cocks, $A^9 A^{10}$, $A^{12} A^{13}$, so constructed that a supply of fluid under pressure may be forced through either the pipe, $A^{14}$, or, $A^{15} A^{15}$, as desired, both at the same time, or at different times, together with furnaces, M B², through which pass the said pipes, $A^{14}$ and $A^{15}$, so that both may be heated together, or separately as the current of heated fluid is driven through one or both, substantially as described.

17. In combination with the pipes, $A^{14}$, $A^{15}$, $A^{15}$, series of independent and more and more distant heating furnaces, M B², and trackway and electric conductor, F F, $K^{10}$, the suction fan, or exhaust, E, adapted to draw the heated fluid contents of said pipes through the same, outwardly from the source of heat of said pipes, and discharge the same externally, substantially as and for the purposes described.

18. The combination of a trackway F, conduit J, conductor $K^{10}$, force pump, A, lines of independent heat supplying conductors, $A^{14}$ $A^{15}$, extended along the rails and conductor, F F and $K^{10}$, a single line of heat conductor alongside each rail, and each conducting lead, and means for discharging the contents thereof along the line of said trackway, the series of heating furnaces M B², and current of heated fluid maintained under pressure along said heat conductors adapted to warm and dry the contiguous rails and insulators of said conductor, substantially as described.

19. In combination with the force pump, A, heat pipes, $A^{14} A^{15}$, rails, F F, electric conductor, $K^{10}$, and heating furnace, the double coils of pipe, $A^{14} A^{15}$, contained within the chamber, M, the heating gas burner, B², the gas supply main, B, the electro-magnets, C' D', the valve, $D^5$, operated by the armatures of said magnets, the electric gas lighting device, $D^6$, in contact with the current of burning gas when turned on, together with the electric supply wires, C and D, supplied with electricity as desired, and operating to move the said armatures, upon said valve, $D^5$, to open said gas valve, and furnish a spark, at $D^6$, to ignite the same, or close the said valve and shut off the flow of said gas, from a distant station, substantially as described.

20. In combination with the continuous pipe, $A^{14}$, formed into a coil at different intervals along the line of an electric railway, and adapted to extend along and contiguous to but separate from the conducting lead thereof, means for forcing a current of fluid through the said pipe, $A^{14}$, together with a heating device such as a gas burner or burners within or in contact with said coils, said gas burner supplied from a gas pipe through a valve operated by electro-magnets, to turn on or off the said gas, and with an electric gas lighting device to ignite the same, said electro-magnets operated by electric currents from a distance through the electric wires, C and D, substantially as described.

21. The combination of force pump A, heat pipes, $A^{15}$ $A^{15}$, rails, F F, and the series of different coils of pipe formed upon, $A^{15}$, at different points along the line, the gas heater, $B^2$, at each of said coils of pipe, and adapted to heat the same, gas pipe, B, electro-magnets, D′C′, electric gas lighting device, $D^6$, valve, $D^5$, operated by said electro-magnets, and electric supply wires, C and D, substantially as and for the purposes shown and described.

22. In an electric railway, in combination with the conduit, J, having one side, J′, integral with said conduit and terminating in a free margin along the slot, T, and the opposite side terminating along a free margin, $J^2$, of the opposite side of said conduit, at such distance transversely from the slot as to leave an enlarged open space between said slot margin and said terminal margin a continuous longitudinal cover, U, adapted to rest by its under side upon said free margin, $J^2$, cover the interior of said conduit along the opposite side of said slot, the free margin of said cover forming the opposite side of said slot, T, said cover, U, removable in longitudinal sections, so as to uncover the said conduit and permit access to its interior together with a detachable system of conductors secured in place by the closing of said covers substantially as described.

23. In an electric railway in combination with a longitudinally extended line of electric conductors, the conduit, J, located between the tracks of said railway open above along one side of the slot, T and permanently closed upon the other so as to expose the interior across nearly one-half its diameter, a removable cover, adapted to form the cover of one side of said conduit, and face against the opposite side of said conduit, leaving slot, T, open, said cover constructed to form part of the street surface along one side of said slot, and having a recessed cover suitably paved over to conform to and be uniform with the said street surface upon the opposite side of said slot, T, substantially as described.

24. In combination with the conduit, J, having one side integral therewith and overarched along the slot, T, and opposite side terminated by the vertical side of said conduit beneath the street level, the hinged cover, U, formed in sections longitudinally, and having its upper surface recessed, and filled with street paving composition, and constructed when closed to form a part of the street paving, and when opened to expose the interior of the conduit along one side of the slot, T, together with a line of detachable electric conductors adapted to be inserted, fixed in, or removed from said conduit when thus opened, the whole constructed substantially as described.

25. In combination with the conduit, J, overarched along one side to the margin of the slot, T, and the other terminating back from the line of said slot, and beneath the surface level of the opposite side of said slot, T, so as to open and expose the said conduit upon one side $J^4$, thereof, the removable hinged cover, U, hinged laterally in rear of said opening, $J^4$, formed in longitudinal sections of a convenient length, and adapted to rest by its under surface upon the free vertical edge, $J^2$, of one side of said conduit, together with means for securing the said cover in place against accidental displacement, substantially as described.

26. In combination with the conduit, J, overarched at one side, J′, and vertical upon the opposite side, having an open space, $J^4$, from the margin, $J^2$, to the slot, T, the substantially horizontal cover, U, having arms, $U^5$ $U^6$, extending laterally in rear of the edge, $J^2$, said cover adapted to be raised upon said hinges to uncover the said conduit, substantially as described.

27. In combination with the conduit, J, complete upon one side, J′, and terminating at the vertical edge, $J^2$, upon the opposite side, the removable cover, U, adapted to rest upon the free edge, $J^2$, and extend over the space, $J^4$, to the margin of the slot, T, said cover, U, having hollow or dish-shaped top, and said dish filled permanently with street paving composition or material, the said cover and its contents adapted to be raised to open the said conduit, and closed to form a paved street surface, substantially as described.

28. In an electric railway conduit the continuously extended laterally open side, $J^4$, from the lateral edge $J^2$ of the conduit to the slot, T, the longitudinally and continuously extended series of hinged removable covers, U, dripping ledges, $U^3$ $U^3$, and conducting lead, $K^{10}$, laterally out of line with said slot, together with drain connecting pipe or pipes, N, leading into drain or sewer, O, and accessible for cleaning through the enlarged opening formed by removal of said cover, U, subtantially as and for the purposes described.

29. The combination, in an electric railway, of trackway, F F, conduit, J, conducting leads, $K^{10}$, slot, T, force pump, A, series of separate reheating furnaces M $B^2$, heat pipe, $A^{14}$, adapted to be reheated at intervals by said furnaces, and extended along contiguous to conducting leads and in contact with insulators, removable cover of said conduit and drain, N, adapted to convey flood water from said conduit, and accessible through said opening formed by removal of said cover, substantially as described.

30. In an electric railway, in combination with the conducting supply lead, $K^{10}$, the kiln-dried and pitch-saturated wooden supporting bars, K, and insulators, L, said bars, K, bored or grooved from end to end, together with heat pipe, $A^{14}$, extended along said bars, and embedded therein, said wooden bars serving to protect the said heat pipes from rapid dissipation of heat, and means for supplying a current of heated fluid along said pipe, $A^{13}$, substantially as described.

31. In an electric railway, in combination with the conducting leads, $K^{10}$, the continuous wooden insulating and supporting bars K and heat pipes, $A^{14}$, contiguous thereto, and supported along the insulators of said leads the expansion joints, $A^{21}$ $A^{22}$, adapted to permit expansion and contraction of said pipes longitudinally, without disturbance of insulation of said supports, substantially as described.

32. In an electric railway, in combination with the conduit, J, having vertical slots, $J^5$, along the walls thereof, open above, the insulator, L, supporting the conducting lead of said railway having its rear provided with a contracted neck, adapted to enter said slot, $J^5$, and a terminal enlargement to engage in rear of said slot, and adapted to prevent lateral displacement thereof by the current-gathering devices of a motor car moving along in contact with the same, together with a removable cover of said conduit constructed, when in place to prevent vertical upward displacement of the same, and when said cover is removed to permit said neck to enter or be removed from said slot, together with the insulators and conducting lead of said railway, substantially as and for the purposes described.

33. In an electric railway, the conduit, J, provided with slot, T, and open side, $J^4$, extending from the said slot down to the free vertical edge, $J^2$, and vertical slot or support, $J^5$, extended upward to the free edge of $J^2$, and a removable cover, U, adapted to extend over and close the opening, $J^4$, along one side of the slot, T, of said conduit, the electric lead, $K^{10}$, the support K, and insulator, L, said insulator having contracted neck adapted to fit into $J^5$, and an enlarged lead in rear, all in combination with each other, and so adapted together that, when said cover, U, is open, the said electric leads and insulators may be formed up in a continuous line, and dropped into place, together with the line of heat pipe, $A^{14}$, secured along said conducting leads, and all inserted together as the different successive sections of the cover, U, are opened, the whole held securely in place by the cover U, resting above the said insulators, when closed, substantially as described.

34. In an electric railway the combination of force pump, A, furnaces, M $B^2$, insulating and supporting bars, K K, conducting leads, $K^{10}$ $K^{10}$, insulators, L, heat pipe $A^{14}$ communicating with said furnaces, M $B^2$, and extended along the line of said supporting bars and insulators, conduit, J, slot, T, removable side cover, U, yokes H, H, track supports, $H^3$, $H^4$, and rails, F F, the whole constructed to operate substantially as herein shown and described.

35. In an electric railway, having a trackway extended continuously forward, and an electric conducting lead extended along said trackway, an independent line of piping extended along parallel with said trackway, one pipe parallel with each rail thereof, and contiguous thereto, said pipes adapted to carry a current of fluid along the same, and separate enlarged points of heat supply at intervals along said pipes, and at each of said points a heating furnace adapted to replace the heat distributed to said rails in the advance of said current forward from its initial point of heating, together with a force pump and furnace at said initial point constructed to force a current of heated fluid along said pipes and means for controlling the operations of said furnaces from a distant station along said lines, substantially as and for the purpose described.

36. In an electric railway, in combination with a force-pump, a continuous pipe extended along the insulators of the conducting lead of said railway, said force pump constructed to force a current of fluid through said pipe, a series of separate heating furnaces distributed along the line of said pipe and adapted to restore or maintain the heat thereof at a relatively equal and moderate temperature, said furnaces and the heating processes thereof controlled by an independent connection with said station, substantially as described.

37. In an electric railway having a conduit, and a continuous conducting lead extended along the same, in combination with said lead a line of insulators secured to said conduit and constructed to support said lead, together with vertical dovetail supports of said insulators in said conduit, and a removable cover of said conduit, the whole so constructed that when said cover is in place it will rest upon and prevent upward displacement of said insulators, and when said cover is removed the said insulators and their attached conducting lead may be removed, inserted, or replaced, substantially as described.

38. In an electric railway having a conduit and secured to and along the same a longitudinal electric conducting lead, by means of a series of electrically insulating supports, a cover of said conduit having a recessed upper surface filled with concrete or other street paving material in permanent form, said paving material constructed to conform in purpose and material to the adjacent ordinary non-metallic street paving, and said cover its attached pavement removable to expose said conduit and said conducting lead, and said conducting lead and the supports thereof adapted to be removed when said cover is raised, and the same locked in place in slots or the like integral with said conduit by the closing of said cover therefrom, and said cover thus replaceable to form a permanent continuous street pavement, substantially as described.

39. In an electric railway a continuously extended pipe provided with a current of heated fluid, parallel with the conducting leads of said railway, and disconnected therefrom, located between said leads and their insulated conduit supports, said heat pipe provided with a partially diathermal non-metallic covering, adapted to gradually diffuse the heat thereof to the insulators of said conducting leads, said leads having their metal contacts exposed to the current gathering devices of a motor car of said railway, substantially as described.

40. In a railway, in combination with the tracks thereof a continuous heat supplying pipe extended along each rail of said trackway, separate from, and parallel and contiguous to the same, said pipe constructed to contain a current of heated fluid, and surrounded with a partially diathermal and water-proof, non-metallic covering, together with means for supplying through said pipes a continuous flow of a heated fluid, substantially as and for the purposes described.

41. In an electric railway having a conducting supply lead extended along the same, and a continuous line of wooden insulating bars supported at intervals on bracket supports and insulators, in combination with a continuous heat pipe extended along said line of wooden bars from bracket to bracket and along said lead, and disconnected from contact therewith and along said line of wooden bars between the supports of said brackets and said lead, and adapted to heat said insulators without unduly heating said metallic lead, together with means for forcing a current of heated fluid through said pipe, substantially as and for the purposes described.

ISAAC W. HEYSINGER.

Witnesses:
M. B. FENNINGER,
J. L. HEYSINGER.